INVENTOR
MILTON L. PRIBAN.
BY
ATTORNEY

July 6, 1954

M. L. PRIBAN 2,683,246

ELECTRIC MULTIPLE MOTOR CONTROL SYSTEM FOR MULTIUNIT
PRINTING PRESS DRIVES OR THE LIKE

Filed Oct. 6, 1951

INVENTOR
MILTON L. PRIBAN.
BY
ATTORNEY

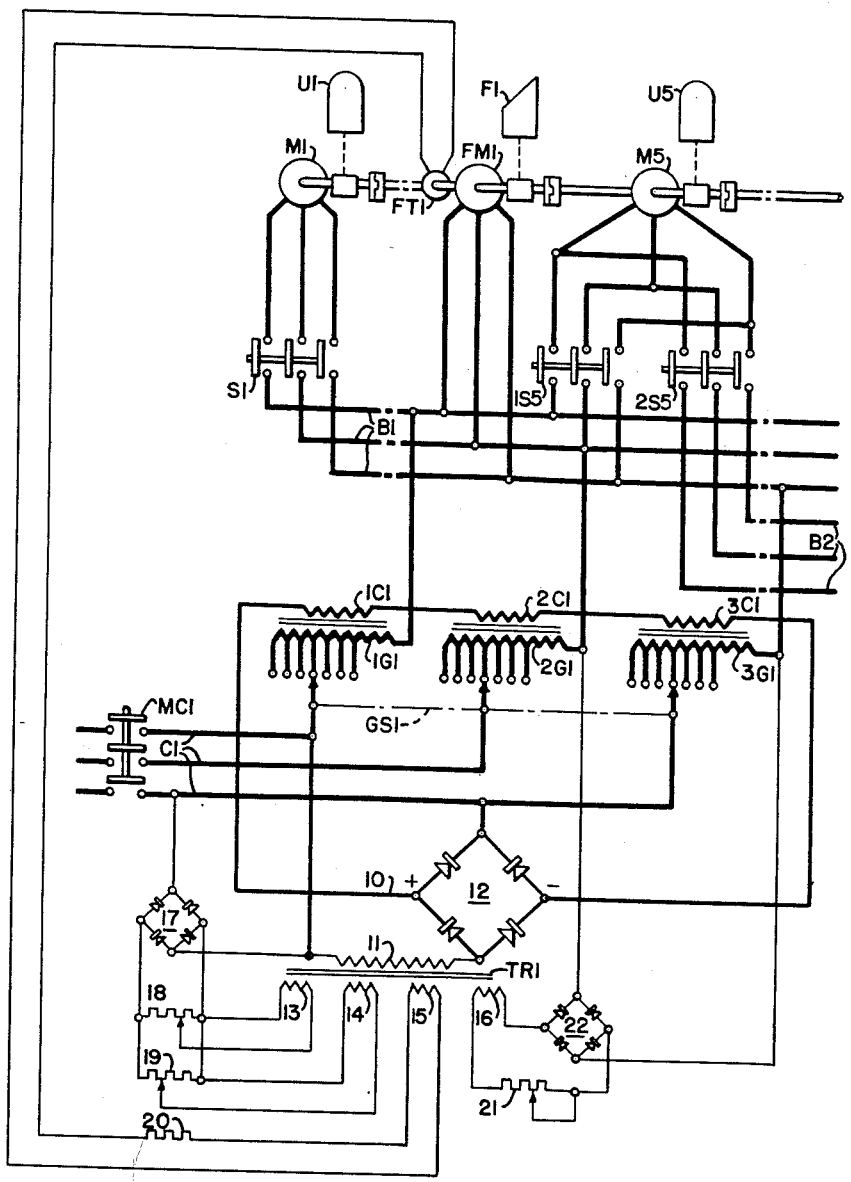

July 6, 1954

M. L. PRIBAN 2,683,246

ELECTRIC MULTIPLE MOTOR CONTROL SYSTEM FOR MULTIUNIT
PRINTING PRESS DRIVES OR THE LIKE

Filed Oct. 6, 1951

INVENTOR
MILTON L. PRIBAN.
BY
ATTORNEY

Patented July 6, 1954

2,683,246

UNITED STATES PATENT OFFICE 2,683,246

ELECTRIC MULTIPLE MOTOR CONTROL SYSTEM FOR MULTIUNIT PRINTING PRESS DRIVES OR THE LIKE

Milton L. Priban, Clarendon Hills, Ill., assignor to Cline Electric Manufacturing Company, Chicago, Ill., a corporation of Illinois Application October 6, 1951, Serial No. 250,146

35 Claims. (Cl. 318—45)

My invention relates to systems for controlling the speed of a group of mechanically coordinated electric motors and, in a particular aspect, to speed control systems for the jointly operating drive motors of a multi-unit or multi-group printing press or the like plurality of simultaneously working units.

It is an object of my invention to provide a control system in which a single condition-responsive controller determines and regulates the coordinated operations of a group of parallel connected motors and in which the number of motors thus jointly controlled can be selectively varied in accordance with different job requirements, for instance, in accordance with the number of printing press units or groups that are to operate with a folder unit of a newspaper or magazine printing press. It is a more specific object to achieve the just-mentioned performance with the aid of saturable reactors.

Another object of my invention is to make the current-carrying capacity (or impedance per motor) of such a controller adjustable or controllable in accordance with the selection of the jointly controlled motors so that the control performance relative to each operating motor remains unaffected by changes in the number or total power requirements of the selected motors.

It is also an object of my invention to make the controller operate, in response to a speed-proportional voltage or other condition-responsive signal voltages, in such a manner that the controller will secure maintenance of a chosen motor speed regardless of the selected number of jointly speed-controlled motors.

Still another object, more specific than the foregoing, is to provide a versatile multi-motor control system that permits controlling a large number of in-line arranged and mechanically interconnectable motors, particularly the press-unit and folder drive motors of a multi-unit newspaper printing press, in either one or a plurality of motor groups, each group having a selectively variable number of jointly speed-controlled motors, for instance, a selective number of press motors to operate together with one of the respective folder motors of the just-mentioned printing press drive.

My invention also aims at providing a multi-motor control system which, while satisfying one or several of the aforementioned objects, is suitable for multi-phase alternating-current induction motors, such as wound-rotor or squirrel-cage motors, and permits controlling a selected number of such motors to run in parallel at a regulated subsynchronous speed adjustable over a wide range of speed values including, if desired, the low speeds needed in a multi-unit printing press drive or the like for inching, threading or accelerating operations.

It is also an object of my invention to incorporate into a multi-motor control system the controls needed for one or more auxiliary motors for inching or threading operations or for breakaway torque, and to make the control performance for the unit drive motors and that for the appertaining auxiliary motor selective and mutually exclusive.

The foregoing and other objects of my invention, as well as its essential features set forth with particularity in the claims annexed hereto, will be understood from the following description in conjunction with the embodiments shown by way of example on the accompanying drawings, in which:

Fig. 5 is a schematic one-line circuit diagram of the power connections of a third control system, and Figs. 6a and 6b, to be placed together and hereinafter jointly referred to as "Fig. 6," show a more detailed three-phase diagram of part of this system; while

Figure 1:
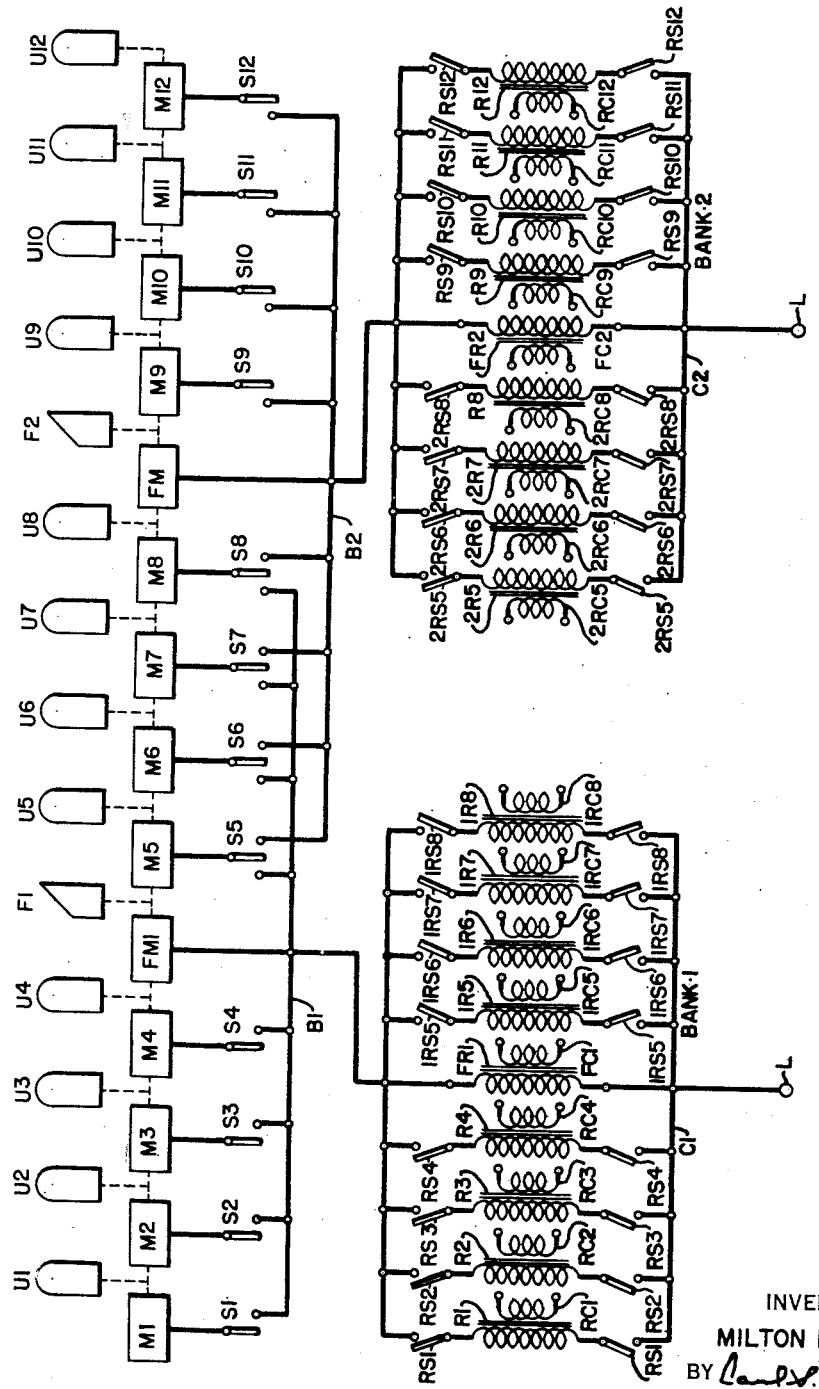
Fig. 1 is a schematic one-line circuit diagram of the main power connections of a motor control system for a multi-unit newspaper printing press drive, while Figs. 2a and 2b, which are to be placed side-by-side to form a single illustration and are hereinafter jointly referred to as "Fig. 2," show a more detailed three-phase circuit diagram of part of the same system.
Figure 2B:
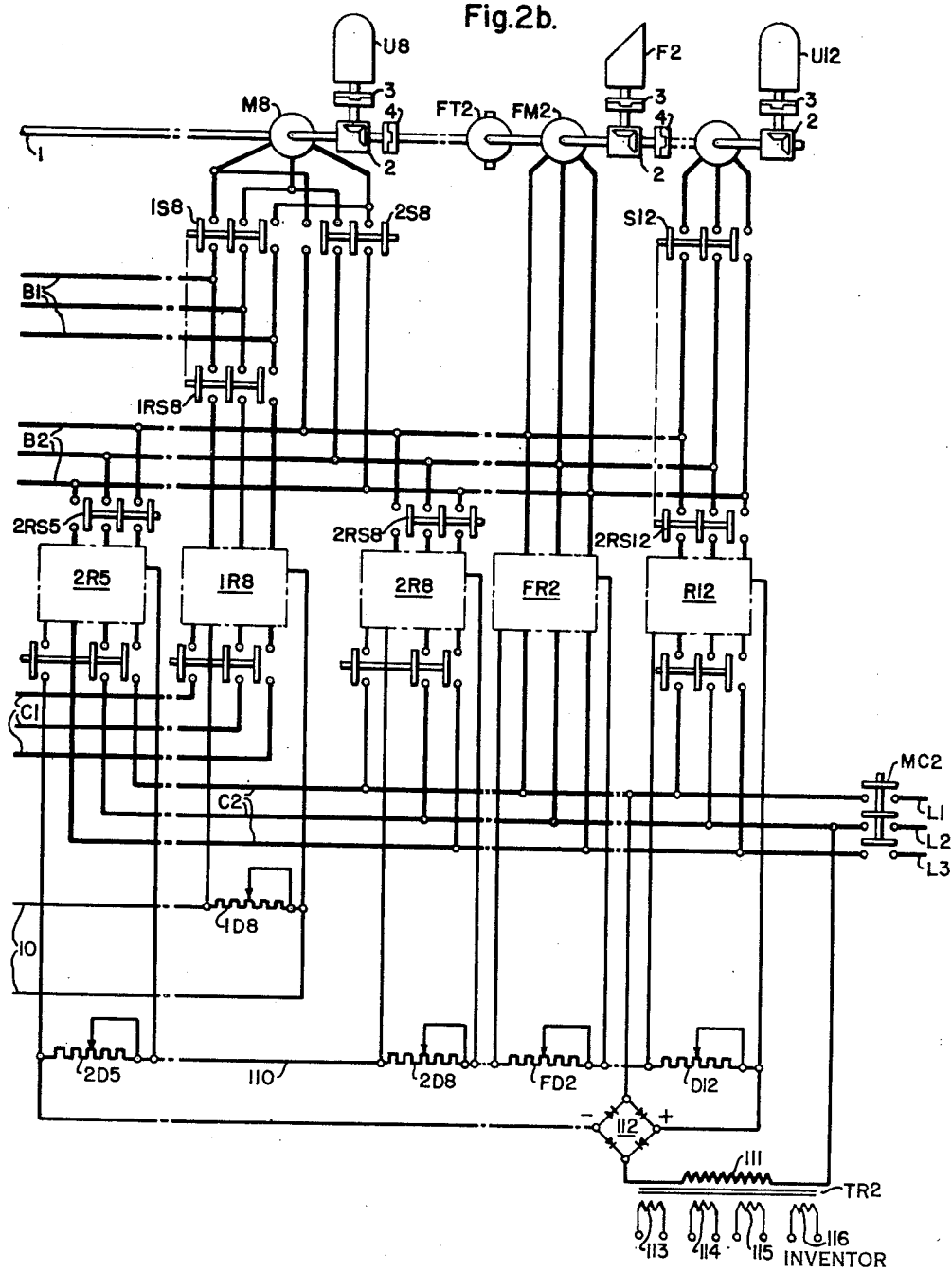
Figure 2A:
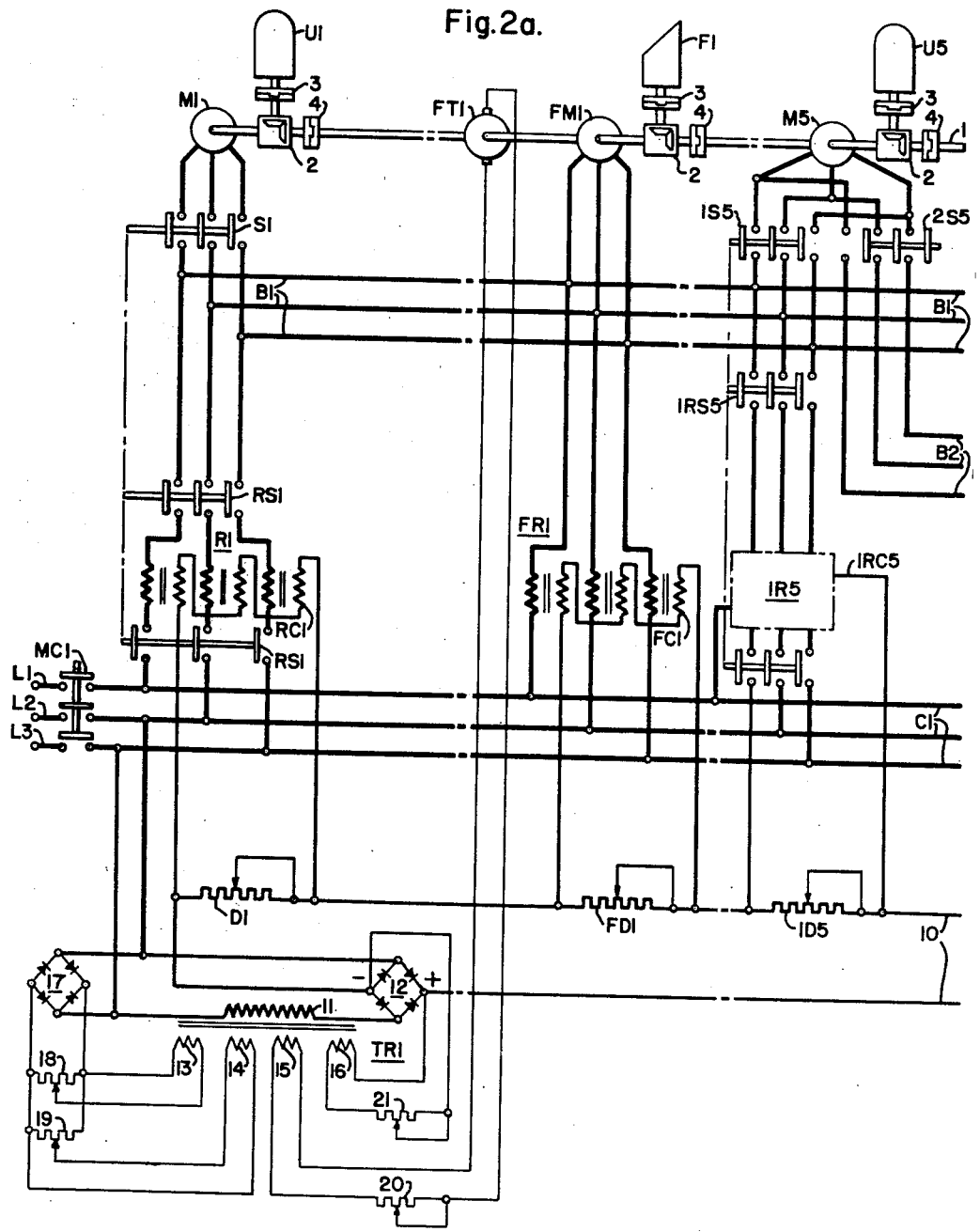

The control system of Figs. 1 and 2 pertains to the drive of a newspaper printing press with twelve press units denoted by U1 through U12 and two folder units F1 and F2, only the folder units F1, F2 and the press units U1, U5, U8 and U12 with the appertaining components of the control system being shown in the three-phase diagram of Fig. 2. Each of the fourteen press and folder units is driven by an induction motor denoted by M1 through M12 and FM1, FM2, respectively. The motors (as well as those in the other embodiments) are either of the wound-rotor or squirrel cage types. They are axially aligned so that the appertaining rotor shafts 1 may be directly interconnected to equalize the speed of the separate press and folder units. Each rotor shaft drives the appertaining press or folder unit through a bevel or worm gear 2 and a coupling 3. Each shaft 1 is equipped with a coupling 4 which permits joining the shaft with that of the adjacent motor. Coupling 4 is preferably of the "differential type," i. e. its two members are angularly adjustable relative to each other to permit a proper phasing of the rotors.

The just-described in-line arrangement of multiple-unit drive motors is known as such from Patent No. 1,877,387 of A. J. Cline. It permits coupling a selected number of press units with either one of the folders, or operating both folders at the same time but independently of each other, each with a selected group of press units. Of course, the entire line of units may have more than two folders if desired. It will be understood that in each group of units the web to be printed upon passes through the press units and eventually reaches the folder of the group where the webs from the several printing units are reduced to page form. Details of the printing procedure and the appertaining web guide and printing means are generally known and not essential to the present invention so that their further description is unnecessary.

Referring particularly to the basic diagram of Fig. 1, it will be recognized that all motors can be energized from two bus systems B1 and B2. Each bus system is hereinafter referred to simply as "bus," although it may be single-phase or multi-phase and hence may comprise a plurality of individual bus conductors. The folder motor FM1 is shown permanently connected with bus B1 while folder motor FM2 is shown in permanent connection with bus B2. Each of motors M1 through M12 is equipped with a switch S1 through S12, respectively. The connection of switches S1 to S4 is such that each of motors M1 to M4 can be selectively connected to bus B1 in parallel relation to folder motor FM1. Similarly the switches S9 to S12 permit a selective connection of each of motors M9 to M12 to bus B2 for parallel operation with folder motors FM2. The switches S5 to S8 are designed as two-way switches so that each of motors M5 to M8 can be selectively connected either with bus B1 or with bus B2.

When any number of motors M1 through M8 have been coupled together with folder motor FM1 and thus are mechanically interconnected to operate at the same speed, the corresponding switches are closed so that the operating motors are all connected to the same bus B1 and hence receive all the same terminal voltage. In this manner, the electric energization of these motors is equalized through the connecting bus B1. The same applies, of course, to the motors that may be mechanically coupled at a time with the folder motor FM2 and are energized through bus B2.

Each of buses B1 and B2 is connected with alternating-current supply means, such as terminals or mains, through respective voltage control devices which, as will be explained, impress on each bus a variable and regulated potential in response to the speed or another mechanical or electrical operating condition of the group of motors energized from that bus. The voltage control devices, according to a preferred embodiment of my invention, consist of banks of saturable reactors disposed between the current-supply mains C1, C2 and the buses B1 and B2.

According to Fig. 1, two banks of reactors are connected with respective buses B1 and B2. Each bank has a number of reactor units equal to the number of motors that may be selectively connected to the bus appertaining to that reactor bank. The reactor units of the first bank are denoted by R1 to R4, FR1 and 1R5, 1R6, 1R7, 1R8 for the respective motors M1 to M4, FM1 and M5 to M8. The reactor FR1 is shown permanently connected between bus B1 and current supply main C1. The other reactor units are connected parallel to reactor FR1 through respective double pole selector switches RS1, RS2, RS3, RS4, 1RS5, 1RS6, 1RS7 and 1RS8. The reactor bank appertaining to bus B2 is similarly designed, the individual reactor units being denoted by 2R5, 2R6, 2R7, 2R8, FR2 and R9 to R12, and the appertaining two-pole switches by 2RS5, 2RS6, 2RS7, 2RS8, RS9, RS10, RS11 and RS12.

For each number of motors that are to cooperate and to be jointly controlled at a time, the same number of reactors are electrically parallel connected in each bank by closing the corresponding reactor switches. In this manner, each bank as a whole represents an impedient voltage control device of selectively variable current carrying capacity.

While no selector switches are shown for the two motors FM1 or FM2, nor for the two reactor units FR1 or FR2, it will be understood that selector switches may also be provided for these devices in order to increase the flexibility of the control system.

In a control system according to the basic diagram of Fig. 1 each of the current supply means (line terminals L and mains C1, C2) has a multi-phase design while each reactor unit (or other voltage control device) is either single-phase or multi-phase depending upon the number of phases of the buses B1, B2. The detailed circuit diagram according to Fig. 2, for instance, shows three-phase motors connected to three-phase buses B1, B2 and controlled by three-phase reactor units from three-phase current supply mains.

As shown in Fig. 2 for some of the fourteen motors of the printing press drive, the three motor terminals of each motor are connected to the three respective conductors of the three-phase buses B1 or B2. Each of the saturable reactor units, such as unit R1, has a three-phase design, i. e., is composed of three reactor members whose main windings are series connected between the three bus conductors and the three conductors respectively of the appertaining current-supply mains C1 or C2. Each reactor unit has a saturable core or a group of such cores and is equipped with one or several saturation control coils. Since such saturable reactors are generally known as such, a detailed description of their design appears unnecessary. It may be mentioned, however, that for the sake of simplicity each reactor unit according to Fig. 1 is shown to be equipped with only one direct-current control coil, these control coils being denoted by RC1 to RC4, FC1, 1RC5, 1RC6, 1RC7, 1RC8, 2RC5, 2RC6, 2RC7, 2RC8, FC2 and RC9 to RC12, respectively. In the three-phase circuit design of Fig. 2, the three individual control coils RC1 of the three-phase reactor unit R1 are series connected in a control circuit 10, preferably in parallel relation to a calibrating resistor D1. The corresponding control windings of reactors R2 to R4 are similarly connected in the same control circuit. The control coils FC1 of the three-phase reactor unit FR1 are likewise series connected in the control circuit 10, again preferably in parallel relation to a calibrating resistor FD1. The same connection is used for the control windings and the appertaining resistors, such as resistors 1D5 and 1D8, of reactors 1R5 and 1R8.

The control windings of the reactors pertaining to the second bank of reactors are similarly connected in a second control circuit 110 as is apparent in Fig. 2 from the connection shown for the calibrating resistors 2D5, 2D8, FD2 and D12 of respective reactors 2R5, 2R8, FR2 and R12.

It should be understood that in this and all other embodiments of the invention, the reactor control windings, here shown series-connected with one another, may be parallel connected or may be arranged in a combination of series and parallel connections, provided the current flowing in each reactor control winding causes the same response of the alternating-current impedance of all simultaneously controlled bank reactors.

According to a preferred embodiment of the invention, the switches pertaining to each motor and its corresponding reactor unit are mechanically or electrically interconnected to operate simultaneously or as a single unit. For instance, the switch S1 (Fig. 2) for connecting motor M1 to bus B1, and both poles of switch RS1 may be joined to form part of a single contactor, this being schematically represented by a broken-line connection S. It is then merely necessary to close a single selector switch for connecting the desired motor to the proper energizing bus and for also adapting the current capacity of the control reactors to the proper value.

The speed of any selected group of motors joined to the same bus depends upon the terminal voltage applied to that bus. This bus voltage is determined by the voltage drop, and hence by the effective reactance, of the appertaining reactor bank. The effective reactance of each bank is controlled by the premagnetization provided by the saturation control coils of the individual reactor units. When the premagnetization is a minimum, the reactor cores are unsaturated so that the effective reactance of each reactor and of the entire bank is high, and the bus voltage is a minimum. When the reactor control coils provide a high premagnetizing field, the reactors become saturated during the period of each current wave to an extent depending upon the degree of premagnetization and reduce the effective reactance so that the bus voltage is correspondingly high. Since the main reactance windings of all reactors of each bank are tied together in parallel relation and since all appertaining control windings are jointly controlled from the same control circuit 10 or 110, each reactor bank behaves as a unit so that all motors of a group, in mechanical as well as electrical respects, are forced to behave as a unit and are synchronized at a speed determined by the voltage conditions of the appertaining control circuit 10 or 110.

Due to the fact that each change in the selection of cooperating motors is accompanied by the proper capacity adjustment of the control reactors, the control effect is independent of the number of reactors and motors operating at a time so that the same voltage of the control circuit 10 or 110 will always give the same response on the alternating-current side of the operating reactors, thus making the control independent of the number of motors controlled.

The control circuit 10 is energized from the output terminals of a rectifier 12 which is series connected with the alternating-current winding 11 of a transfer reactor TR1. Energization for rectifier 12 and winding 11 is supplied from mains C1. The transfer reactor TR1 serves as a mixer for the various signal and control voltages and, in conjunction with rectifier 12, represents also an amplifier of the magnetic type. The transfer reactor has a saturable core equipped with premagnetizing direct-current control coils 13, 14, 15 and 16. Any change in effective reactance of winding 11, caused by a change in the resultant premagnetizing field of coils 13 to 16, causes a corresponding change in the voltage drop impressed on the rectifier 12 and hence a proportional change of the direct-current voltage impressed on the control circuit 10.

Coil 13 receives constant bias voltage from a suitable source of constant voltage. This source is exemplified by a rectifier 17 which is energized from mains C1 and impresses its output voltage on a voltage dividing resistor 18. Coil 14 receives adjustable pattern voltage from across a selectively adjustable portion of a potentiometer rheostat 19 impressed by constant voltage from the rectifier 17. Coil 15 receives the condition responsive signal voltage. In this embodiment, the signal voltage is supplied from a tachometer generator FT1 mounted on shaft 1 of folder motor FM1. A calibrating resistor 20 may be interposed if necessary. If motor FM1 is a wound-rotor motor, then a signal voltage may be derived from the secondary motor circuit to excite coil 16 in dependence upon the slip frequency of the motor. Coil 16 receives a feedback voltage from across the output terminals of rectifier 12 preferably through a calibrating resistor 21. The voltage feedback to coil 16 may be adjusted to supply most of the premagnetization needed for any operating condition of the transfer reactor so that the coils 14 and 15 are called upon only to supply the additional stimulus needed to shift the operating condition of the transfer reactor in accordance with the change of voltage needed in circuit 10 to maintain the motor speed at a desired value. This value is adjusted by the slider setting of control rheostat 19. When the motor speed is in accordance with the value adjusted at rheostat 19, the excitation of coil 14 is approximately balanced by the speed responsive excitation of coil 15. When the motor speed departs from the desired value, the resultant premagnetizing field of coils 14 and 15 assumes a value of the polarity and magnitude needed to restore the proper speed. The bias excitation of winding 13 depends upon material and design features of the transfer reactor and remains constant during the operation. Under certain conditions such a separate bias may not be necessary.

It will be understood that, if desired, the various premagnetizing control windings of the transfer reactor TR1 may be combined with one another to obtain a smaller number of windings by correspondingly joining the appertaining electric excitation circuits. Since the transfer reactor is essentially a magnetic amplifier, the various magnetic and electric circuit modifications well known from magnetic amplifiers may be employed instead of the one here exemplified.

The control circuit 110 for the second reactor bank is energized through the alternating-current winding 111 of a transfer reactor TR2 and a series-connected rectifier 112 in the same manner as described with reference to control circuit 10 and transfer reactor TR1, except that the control coils 113, 114, 115, 116 of reactor TR2 are energized from respective voltage supply means that receive excitation from the mains C2 or from system components relating to bus B2 and folder motor FM2. For instance, coil 115 is connected (not shown) with a tachometer generator FT2 joined with motor FM2, while coils 113, 114, 116 are energized in a manner analogous to the energization of coils 13, 14 and 16, respectively.

A reactor control system of the type described affords a wide range of speed control. If desired, this range can be extended down to the low creeping speeds needed in printing press operation for threading, inching or break away torque. This has the advantage that the same induction motors that operate the printing press system under normal printing conditions may also serve for the just-mentioned slow speed operations thus making it unnecessary to equip the system with separate inching motors.

It will be understood that such a wide range of speed control requires correspondingly large reactors. However, a system of this type also lends itself to the provision of one or more separate inching motors as known from Patent 2,211,002 of A. J. Cline. Such a small auxiliary motor is preferably joined with the shaft of each folder motor. It may be equipped with a reactor type control interlocked with the main motor control and, as a rule, requires an only limited speed range since inching speeds are necessarily single speed adjustments. An example of such an auxiliary control with its appertaining control and interlock components is embodied in the system shown in Figs. 3 and 4 and described presently.

Figure 3:
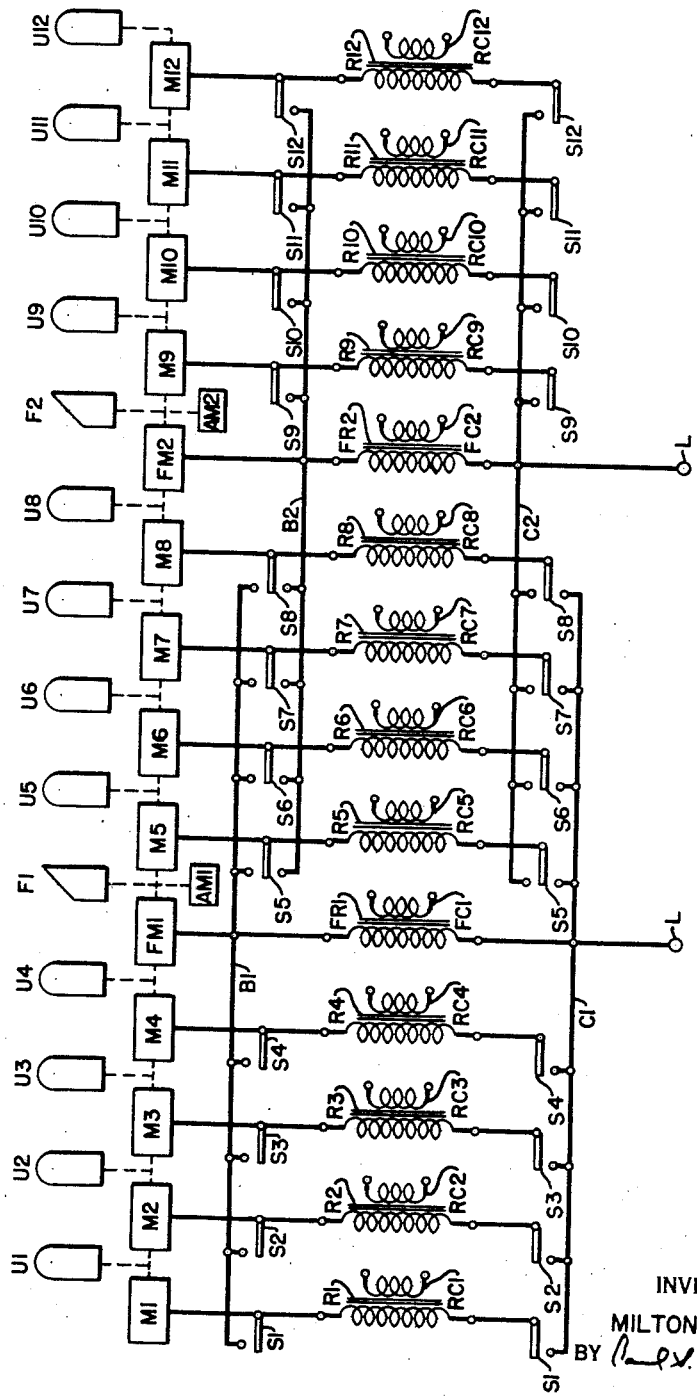
Fig. 3 is a schematic one-line circuit diagram of the power connections of a second control system, and Figs. 4a and 4b, to be placed together and hereinafter jointly referred to as "Fig. 4," show a more detailed three-phase circuit diagram of part of the system.
Figure 4A:
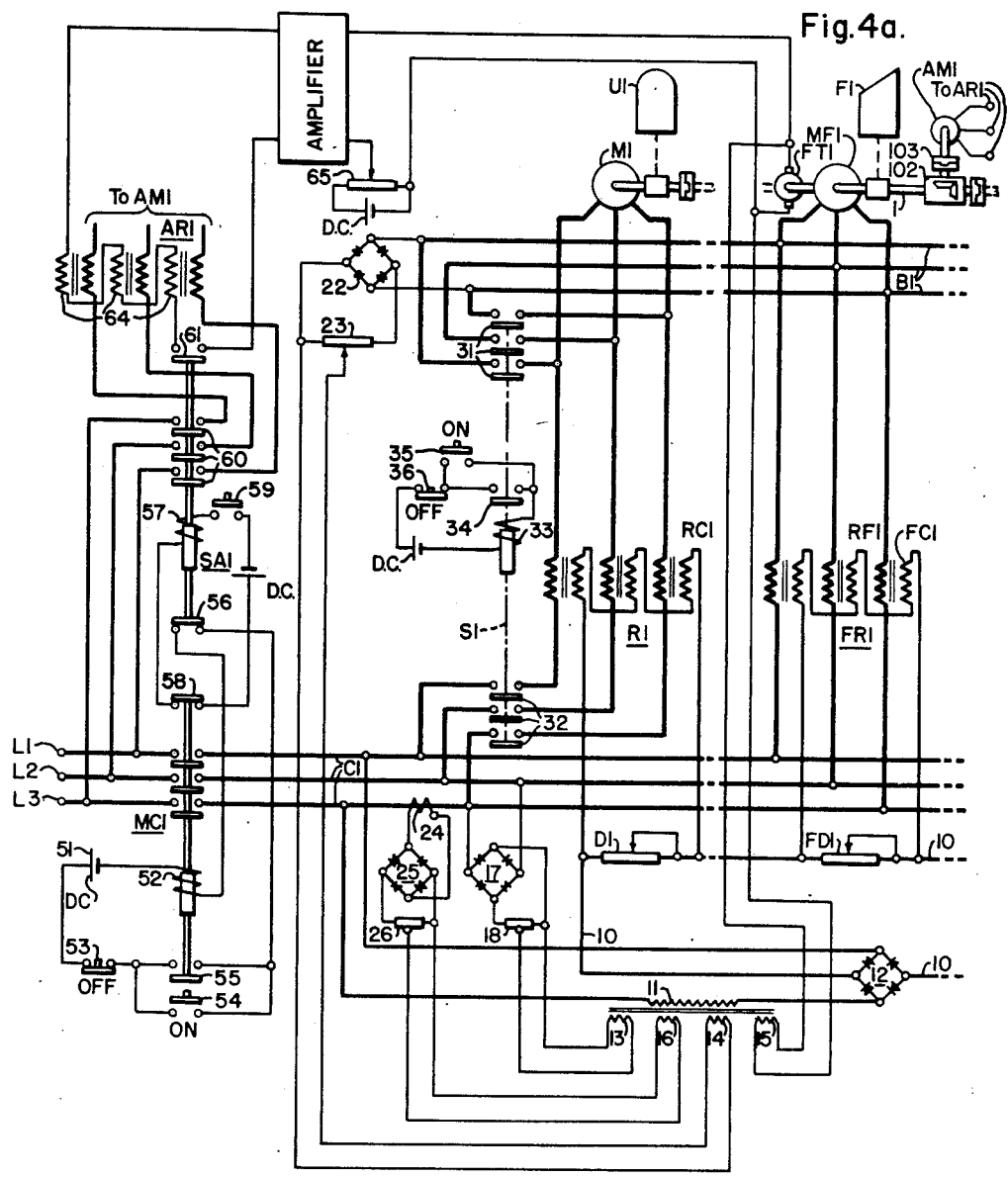
Figure 4B:
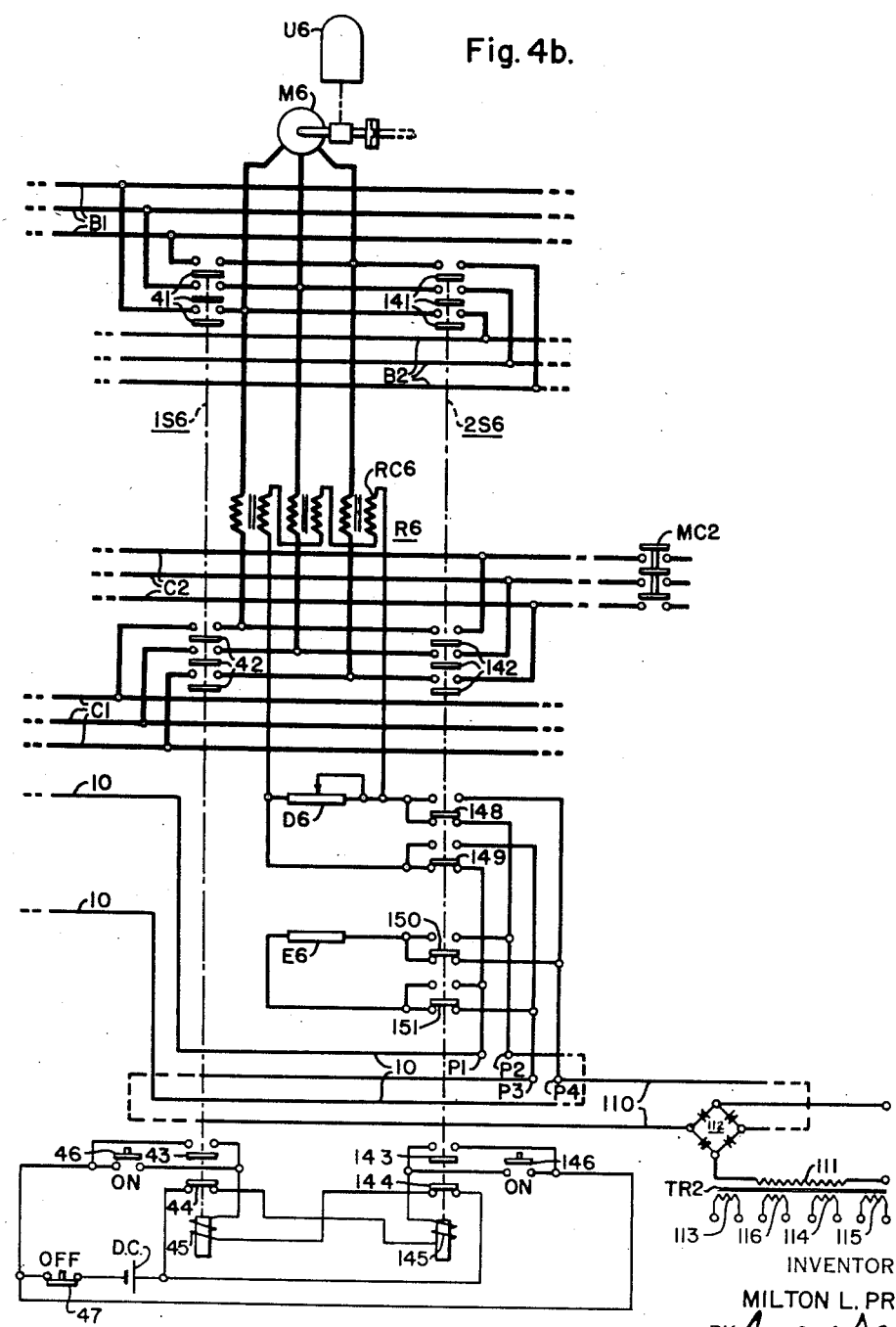

The multi-motor control system according to Figs. 3 and 4 is also designed for a printing press drive with twelve press units and two folder units each having an appertaining alternating-current motor of the induction type. In the basic system diagram of Fig. 3, the units and motors are denoted by the same respective reference characters as in Fig. 1. All motors are axially aligned and interconnectable by couplings in the manner described previously. According to Fig. 3, however, the system is further equipped with two auxiliary motors AM1 and AM2. Motor AM1, as shown in Fig. 4, can be coupled by means of a coupling 103 and a gear 102 with the shaft 1 of folder motor FM1. The second auxiliary motor AM2 (Fig. 3) is similarly connectable with the shaft of folder motor FM2. Each of these auxiliary motors serves to operate the appertaining folder and press group at a slow speed for threading or inching purposes or to provide breakaway torque at the start of the printing operation.

As in the first-described embodiment, the system according to Fig. 3 has two buses B1, B2 which are energized from respective supply mains C1, C2 and are connected with these mains by saturable reactor units denoted by R1 through R12, FR1 and FR2. The folder motor FM1 is shown to be permanently connected to bus B1, and the appertaining reactor FR1 is permanently connected between bus B1 and main C1. Motors M1 to M4 and the appertaining reactors R1 to R4 are provided with selector switches S1 to S4. When any one of these switches is closed, the appertaining motor is connected to bus B1, and the appertaining reactor unit is connected to supply main C1. Motors M9 to M12 and the appertaining reactor units R9 to R12 have respective selector switches S9 to S12 which permit connecting any one or several of these motors to bus B2 while closing the reactor circuit between bus B2 and main C2.

The intermediate motors M5 to M8 and the corresponding reactor units R5 to R8 are equipped with two-way selector switches S5 to S8. These switches permit connecting any one or more of these motors to either bus B1 or bus B2 while simultaneously connecting the corresponding reactors to the proper current supply mains C1 or C2.

With such an arrangement the two banks of reactors overlap and include a number of reactors which can be selectively grouped into one or the other bank. The number of individual reactor units needed in this system is equal to the number of motors.

The detailed diagram of a three-phase bus and three-phase reactor connection according to the schematic diagram of Fig. 3 is shown in Fig. 4 for three of the fourteen motors of the system. Each of buses B1 and B2 comprises three conductors, one for each phase, and each reactor is composed of three members, one for each phase. The appertaining two-pole switches are correspondingly given a three-phase design. For instance, switch S1 has three contacts 31 which, when closed, connect the terminals of motor M1 to the three conductors of bus B1 and three contacts 32 which then connect the terminals of the reactor unit R1 to the three main conductors C1. Switch S1, as exemplified, is designed as an electromagnetic contactor whose coil 33 actuates a self-sealing contact 34 and is energized from a suitable source DC under control by a normally open "On" contact and a normally closed "Off" contact both preferably of the push button type. When motor M1 is to be selected for operation, the actuation of contact 35 causes switch S1 to close and to stay closed until contact 36 is opened by the operator. It will be understood that the switches S2 to S4 and S9 to S12 (Fig. 3) are similar to the switch S1 just described.

Each of the two-way selector switches S5 to S8 may be designed and connected as shown in Fig. 4 for the switch appertaining to motor M6 and reactor R6. Instead of using a single two-way switch S6 as schematically indicated in Fig. 2, this switch is preferably composed of two electromagnetic contactors 1S6 and 2S6 (Fig. 4) which are mechanically or electrically interlocked so that only one of them can be closed at a time, an electrical interlock being illustrated in Fig. 4. The contactor 1S6 has three power contacts 41 which when closed connect the three motor terminals with the respective three conductors of bus B1. Three further contacts 42 of contactor 1S6 then connect the three phase members of reactor unit R6 to the three conductors of mains C1. Contactor 1S6 is also equipped with a normally open self-sealing contact 43 and a normally closed interlock contact 44, all contacts being controlled by a contactor coil 45 which is energized under control by a normally open "On" contact 46 and a normally closed "Off" contact 47 from a suitable current source D. C.

The source DC may be identical with the source D. C. for energizing the above-mentioned contactor coil 33 and with all other sources denoted by DC in Fig. 4. For that reason, all of them are identified by the same reference character. While these sources (or single source), for convenience and lucid illustration, are represented by the symbol of a direct-current battery, it will be understood that any available supply means of substantially constant voltage may be used, such as a rectifier circuit energized from the alternating-current line that energizes the entire control system.

The second contactor 2S6 has contacts 141 to 144 which correspond to the respective contacts 41 to 44 of contactor 1S6 and are all controlled by a coil 145 energized through an "On" contact 146 and the abovementioned "On" contact 47. Contactor 2S6 is further equipped with control contacts 148, 149, 150, 151 whose purpose will be explained in a later place.

When the motor M6 is to be energized from bus B1 to make the press unit U6 cooperate with folder F1, the "On" contact 46 is depressed by the operator. This energizes coil 45 which closes the main contacts 41, 42 of contactor 1S6 and establishes at contact 43 a sealing circuit so that contactor 1S6 remains thereafter closed until the "Off" contact 47 is actuated by the operator. The energizing circuit of coil 45 extends through the interlock contact 144 of contactor 2S6. Consequently, contactor 1S6 can be closed only when contactor 2S6 is open. If motor M6 is to be connected to bus B2 for joint operation with the motor of folder F2, then the contact 146 is to be actuated so that contactor 2S6 will pick up. Since the circuit of coil 145 extends through the interlock contact 44 of contactor 1S6, contactor 2S6 will pick up only when contactor 1S6 is in the illustrated open position.

The reactors of the control system are designed and operative in the same manner as described with reference to the embodiment of Figs. 1 and 2. That is, the reactor control windings such as the windings RC1 of the three-phase reactor R1, the control winding FC1 of the reactor FR1 and the control winding RC6 of reactor R6 are all series connected in the above-mentioned common control circuit 10, preferably each three-phase group of control windings being paralleled by a calibrating resistor such as those denoted in Fig. 4 by D1, FD1 and D6. The control circuit 10 forms a closed loop energized from the direct-current terminals of a rectifier 12 which is series connected with the main winding 11 of a transfer reactor TR1 across two conductors of the alternating-current supply mains C1. The transfer reactor TR1 has direct-current control coils 13, 14, 15, 16 and serves as a mixer and amplifier basically in the same manner as the transfer reactor TR1 in the above-described system of Fig. 2. The voltage drop impressed across the input terminals of rectifier 12 depends upon the effective reactance of winding 11 which, in turn, is controlled by the resultant effect of the premagnetizing excitation impressed on coils 13 to 16. As a result, the excitation of the control coils RC1, etc. of the main reactors and hence the effective reactance of these main reactors and the terminal voltage impressed on the appertaining bus B1 are also under control by the premagnetizing control excitation of the transfer reactor TR1 (see Fig. 4a).

The control circuit 110 for the reactors of the motor group connected to the bus B2 is designed and operative in the same manner. This circuit is energized from a rectifier 112 in series connection with the main winding 111 of a transfer reactor TR2 whose premagnetizing control coils 113 to 116 correspond to the above-described coils 13 to 16, respectively.

Since each of the motors M5 to M8 with the appertaining reactors R5 to R8 may be connected selectively to either bus B1 or bus B2, the system is so designed that the control coils for the reactors appertaining to these motors are also selectively energized either from control circuit 10 or from control circuit 110, depending upon whether the particular motor is energized from bus B1 or from bus B2. The means for securing such a selective excitation of the reactor control windings are illustrated in Fig. 4 for motor M6 and reactor unit R6. Assume that contactor 1S6 is closed so that motor M6 is energized from bus B1. Then the control contacts 148 and 149 are in the illustrated positions and connect the reactor control windings RC6 with the appertaining calibrating shunt resistor D6 across points P1 and P2 of control circuit 10. Consequently, the reactor control coils with resistor D6 are now series connected in the circuit 10 in the same manner as, for instance, the control coils RC1 and FC1 with the appertaining respective resistors D1 and FD1. At the same time, the contacts 150 and 151 connect a resistor E6 across points P3 and P4 of the control circuit 110. The resistor E6 has the same ohmic value as the parallel combination of control coils R6 and resistor D6 and has the same time constant as this combination. Consequently, when the motor M6 is energized from bus B1 and the control windings R6 are connected in the control circuit 10, the control circuit 110 is nevertheless completed through the resistor E6, and the total impedance and time constant of each control circuit are independent of the selected number of reactors controlled by the circuit at a time.

On the other hand, when the contactor 2S6 is closed to operate motor M6 together with folder motor FM2, then the contacts 148 and 149 are lifted and connect the reactor control windings R6 with resistor D6 between points P3 and P4 of control circuit 110, while now the resistor E6 is connected through lifted contacts 150 and 151 between points P1 and P2 of control circuit 10. Consequently, any selective connection of motor M6 to bus B1 or bus B2 is accompanied by a corresponding insertion of the appertaining reactor control windings into the proper one of the two reactor control circuits.

The selector switch means for motors M5, M7, M8 are designed and connected in the same manner as the just-described switch means for motor M6. The two-way selector switch contacts corresponding to contacts 148 to 151 in Fig. 4, of course, may be joined with either one of the two contactors of these switch means; for instance, these contacts may be located in contactor 1S6 instead of in contactor 2S6.

While the transfer reactor TR1 may be controlled in the same manner as in the system of Fig. 2, the system shown in Fig. 4 incorporates a preferred embodiment of the transfer reactor control which will be described presently.

Control coil 13 of transfer reactor TR1 is energized through a rectifier 17 and a potentiometric resistor 18 from mains C1 to provide a suitable bias voltage of constant value. Control coil 14 is energized from the output terminals of a rectifier 22 through a speed control rheostat 23. Rectifier 22 is inputwise connected across the bus conductors B1 and hence impressed by the motor terminal voltage. Consequently, the excitation of premagnetizing control coil 14 is dependent upon the control effect of the system so that the control is essentially a terminal-voltage feedback. Coil 16 is energized from a current transformer 24 through a rectifier 25 and a voltage-dividing resistor 26. The current transformer 24 is coupled with the supply mains C1 so that the voltage impressed on control coil 16 represents a load-current feed-back. Coil 15 is energized from a tachometer generator FT1 which is driven from the shaft of folder motor MF1 (see Fig. 4a).

The control performance in the just-described reactor connections is primarily determined by the voltages impressed on coils 13 and 14. When the speed of the motors simultaneously energized from bus B1 has the desired value, the premagnetizing excitation jointly provided by coils 13 and 14 is approximately balanced. The speed value at which this balance occurs depends upon the setting of the control rheostat 23. When this setting is changed, the proportion of bus voltage applied to the coil 14 changes so that now the just-mentioned approximate balance occurs at a higher or lower motor terminal voltage and hence at a correspondingly higher or lower motor speed. The rheostat 23 thus permits adjusting the speed of the co-acting motors to a desired value within the available speed range. The current feed back voltage impressed on coil 16 and the speed responsive voltage impressed on coil 15 have essentially modifying effects. Particularly the speed responsive voltage in this system is needed only for stabilizing purposes. Consequently, only a very small tachometer generator FT1 is required as is more fully explained in the copending patent application Serial No. 250,082, filed October 6, 1951, of H. R. Behr, assigned to the assignee of the present invention.

The control circuits for transfer reactor TR2 are not illustrated because they are identical with the just described circuits for reactor TR1 except that they receive energization from components active or energized together with the folder motor FM2 (Fig. 3), bus B2 and supply mains C2.

As mentioned previously, an auxiliary motor AM1 or AM2 is provided in each group of drive units for inching and other slow speed operations. Each auxiliary motor has its own control means, those for motor AM1 being illustrated in Fig. 4. The terminals of motor AM1 are connected through the main windings L1, L2 and L3 of a control reactor AR1 to the line terminals of mains C1 under control by a selector switch SA1. This selector switch is interlocked with the main switch MC1 of the supply mains C1. Switch MC1 has a control coil 52 energized from source D. C. through a normally closed "Off" contact 53 and a normally open "On" contact 54, the latter being connected parallel to a normally open self-sealing contact 55 of switch MC1. The circuit of coil 52 extends through a normally closed interlock contact 56 of contactor SA1. Contactor SA1 has its coil 57 energized from source DC. The coil circuit extends through a normally closed interlock contact 58 of the main switch MC1 and through a manually actuable inch contact 59. Contactor SA1 has three contacts 60 series connected with the respective three main windings of the reactor unit AR1 and has a normally open auxiliary contact 61 which controls the direct-current circuit of the premagnetizing control coils 64 of reactor unit AR1.

During normal printing performance, the main switch MC1 is closed and the appertaining interlock contact 58 open. Consequently, the circuit of contactor coil 57 is interrupted so that the auxiliary motor AM1 cannot operate. On the other hand, when switch MC1 is open and the main drive system deenergized, the closing of inch contact 59 causes contactor SA1 to pick up and to energize the auxiliary motor AM1 to operate at a slow speed determined by the premagnetizing excitation of control coils 64. This excitation depends upon the differential resultant of two control voltages. One of these voltages is normally constant and taken from across a portion of a potentiometric rheostat 65 energized from a constant-voltage supply DC. The other control voltage is variable and supplied from the tachometer generator FT1.

The auxiliary motor AM2 is equipped with a similar control system (not shown) except that it is connected with the line terminals of supply mains C2 and interlocked with the appertaining main switch MC2.

Figure 5:
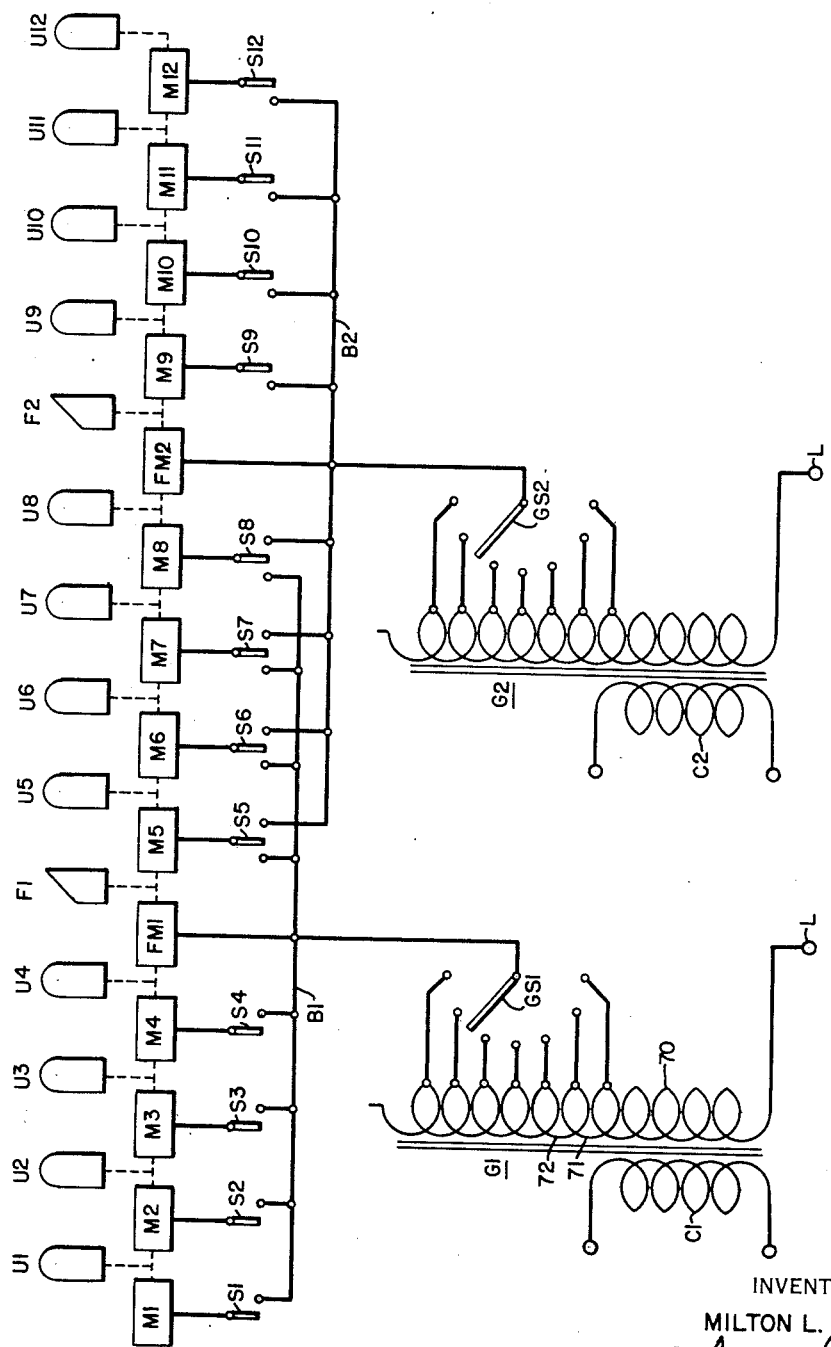
Figure 6B:
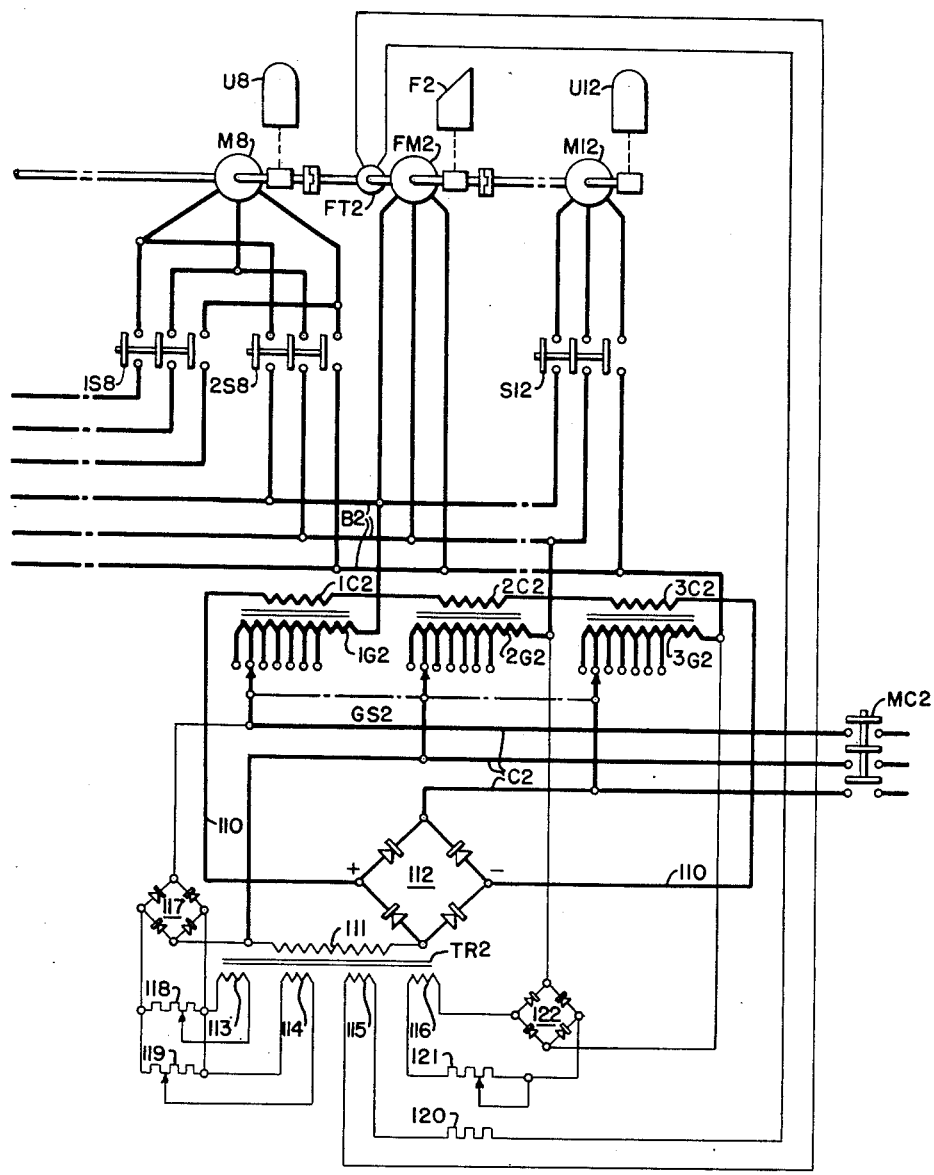

The system shown in Figs. 5 and 6 is designed for twelve press units U1 to U12 and two folder units F1, F2, with corresponding drive motors M1 to M12, FM1 and FM2, in the same manner as the systems described previously. The press motors M1 to M12 are connected through respective selector switches S1 to S12 with two buses B1 and B2 so that any one of motors M1 to M4 can be energized from bus B1, and any one of motors M9 to M12 can be energized from bus B2, while any one of motors M5 to M8 can selectively be energized from either bus B1 or bus B2. The folder motors FM1 and FM2 are shown to be permanently connected to buses B1 and B2 respectively, although, if desired, the motors FM1 and FM2 can also be supplied with selector switches in order to increase the flexibility of the system.

While as far as described the power connections of the system are similar to those of the preceding embodiments, the control system of Figs. 5 and 6 differs essentially in that the voltage control means for each of the two buses consist of a single, though possibly multiphase, reactor unit of the saturable type which is serially subdivided and has taps connected with a selector switch. Each reactor unit is of sufficient current capacity to provide power for the maximum number of motors which it may have to control. Referring to Fig. 5, the reactor G1 appertaining to bus B1 has a main winding section 70 of a current capacity sufficient for controlling all nine motors M1 to M8 and FM1 that may possibly be connected to bus B1 at a time. When a smaller number of motors is connected to this bus, one or several additional reactor sections, such as winding sections 71 and 72, are switched in series with the main winding section 70 of reactor G1 so that the total reactor impedance for any given state of saturation is increased and thus adapted to the smaller number of motors to be simultaneously operated.

The reactor selector switches GS1 and GS2 may be mechanically or electrically joined with the motor selector switches S1 to S8 and S5 to S12 respectively so that any motor selection is automatically accompanied by a corresponding adaptation of the reactor units.

It will be understood that instead of using a single reactor coil with a tapped winding, several individual coil or reactor units can be series connected with one another to secure the same results.

Referring now to the detailed three-phase circuit diagram of Fig. 6, it will be recognized that each of the three conductors of bus B1 is connected through a main reactor coil 1G1, 2G1 or 3G1 with a respective one of the three conductors of current supply mains C1. Each individual phase reactor has a control coil 1C1, 2C1 or 3C1. The three control coils are series connected in a control circuit 10 energized from a rectifier 12. The input circuit of rectifier 12 is series connected with the main winding 11 of a transfer reactor TR1 across the current supply mains. Transfer reactor TR1 and rectifier 12 operate as an amplifying mixer. Reactor TR1 has four control coils 13, 14, 15 and 16. Coil 13 supplies a constant bias and is energized from a rectifier 17 through a voltage dividing resistor 18. Coil 14 receives adjustable pattern voltage from a control rheostat 19 which is also energized by constant voltage from rectifier 17. Coil 16 is supplied with variable signal voltage from across two of the conductors of bus B1 through a rectifier 22 and, if needed, through a calibrating resistor 21. The excitation of the premagnetizing control coil 16 is proportional to the terminal voltage of the group of motors to be controlled and is poled to oppose the premagnetizing excitation of the pattern coil 14. Coil 15 is provided to supply a stabilizing voltage from a tachometer generator FT1 connected with the folder motor FM1 preferably through a calibrating series resistor 20. The control performance of the transfer reactor TR1 is in accordance with that of the corresponding transfer reactor in the above-described system of Figs. 1 and 2. As in the embodiments previously described, the transfer reactor may be replaced by a magnetic amplifier and mixer circuit of different design or by some other amplifying device. The individual control circuits of the transfer reactor or amplifier, of course, may also be modified in various ways, and the resultant response can be made dependent upon any suitable operating condition of the folder motor or of the group of simultaneously operating motors to be controlled or regulated.

The main windings 1G2, 2G2, 3G2 of the three-phase reactors appertaining to bus B2 are series-connected between the conductors of bus B2 and the respective conductor of mains C2. The appertaining reactor control coils 1C2, 2C3, 3C2 are series connected in a control circuit 110 which is energized from a rectifier 112 whose energization is controlled by a transfer reactor TR2 in the same manner as that of the reactor TR1 except that the control voltages are derived from system components associated with the group of motors to be simultaneously energized from bus B2. The individual circuit elements denoted by 111 through 122 correspond to the above-described elements 11 to 22, respectively.

Mains C1 and C2 are preferably separately energized from an alternating-current line through respective switch and protective devices, only the appertaining main switches MC1 and MC2 being schematically illustrated in Fig. 6.

Figure 7:
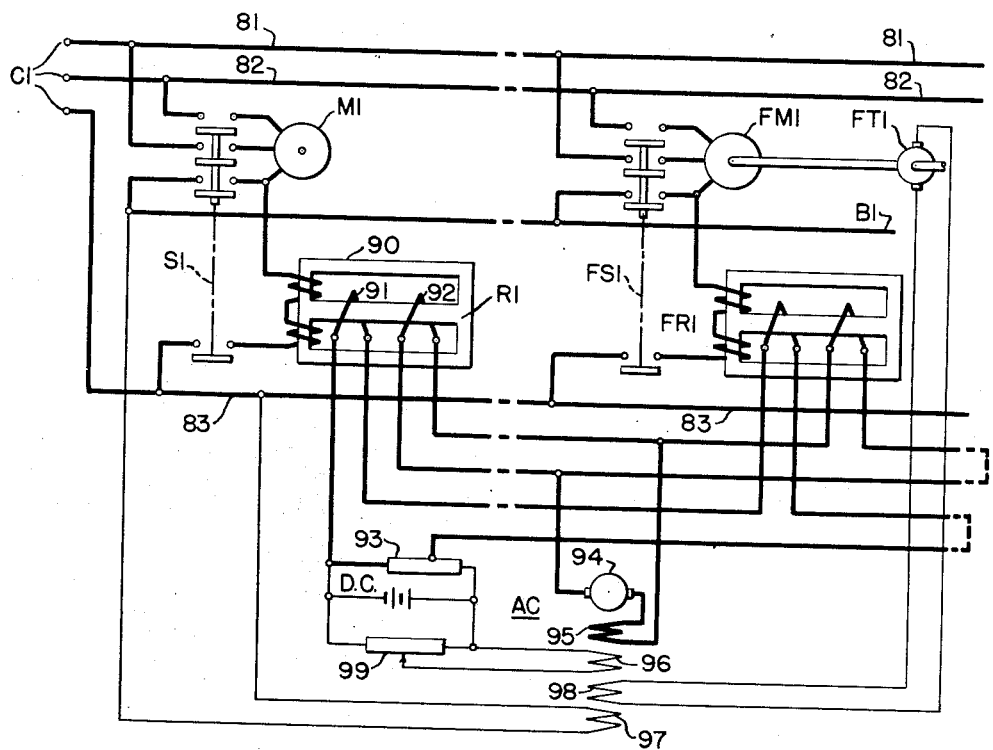
Fig. 7 shows a circuit diagram of a modification applicable in systems according to the preceding embodiments.

The modifications apparent from the embodiment of Fig. 7 is applicable in the basic system according to Fig. 1 or in the system according to Fig. 3. As shown in Fig. 7, two conductors 81 and 82 of the supply mains C1 are directly connected with respective two terminals of each of the appertaining motors when the motor selector switch, such as switch S1 or FS1, is closed. The remaining main conductor 83 is connected with a single conductor bus B1 through voltage control devices designated as saturable reactors of the type described previously. Fig. 8 shows only the folder motor FM1 and one press motor M1 of the group of motors energizable from bus B1. As exemplified in Fig. 7 for the reactor R1 of motor M1, each reactor has a three-legged saturable core 90 with two control coils 91 and 92 on its center leg.

Coil 91 receives constant bias excitation from across a portion of a voltage dividing resistor 93 energized from a suitable source DC of constant direct voltage. Coil 92 is parallel connected to the corresponding coils of the other reactors and is excited by variable voltage from a mixer-amplifier which, in this embodiment, comprises an amplifying dynamoelectric machine AC whose constant speed armature 94 is connected to the circuit of coil 92 to impress it with variable voltage controlled by a group of field windings, four of such windings, denoted by 95 to 98, being illustrated although a smaller or larger number may be used. Field winding 95 is self-excited and shown to be series connected with the armature 94. Field winding 96 receives constant but selectively adjustable pattern voltage from a control rheostat 99 energized from the source DC. The selected slider setting of rheostat 99 determines the speed at which the motors energized through bus B1 are supposed to run. Field winding 97 is excited by feed back voltage taken from across main conductor 83 and the bus conductor, this voltage representing the impedient voltage drop across the bank of active reactors pertaining to bus B1. It is, of course, also possible to derive the voltage feed back excitation from across bus B1 and main conductor 81 or 82, provided the field winding 97 is properly poled. Field winding 98 receives a stabilizing speed feed-back voltage from a tachometer generator FT1 connected with the shaft of the folder motor FM1.

The resultant field of windings 97 and 98 is always opposed to that of the pattern field winding and an approximate balance exists during normal steady-state performance as is well known for dynamoelectric amplifiers. It will be understood that an amplifier of this type may also be used in the other embodiments of the invention instead of the transfer reactors previously mentioned and that, if desired, systems according to Fig. 7 may be equipped with mixer-amplifiers other than of the dynamoelectric type.

Power connections and power control devices of the kind shown in Fig. 7, of course, are equally well applicable in control systems whose basic design corresponds to Fig. 5, except that then only one voltage control unit, such as a saturable reactance device, with several series-arranged sections is provided instead of the parallel operating control units shown in Fig. 7.

Generally, a system in which, as shown in Fig. 7, the buses and power control units have a smaller number of phases than the current supply means requires a smaller number of power control units and a smaller aggregate amount of material for the entire group of units than an otherwise similar system whose number of bus phases is equal to that of the supply mains (Figs. 2, 4, 6), although each individual reactor or power control unit will have to be larger in the former system (Fig. 7) than in the latter system (Figs. 2, 4, 6) for the same power requirements. On the other hand, systems with an equal number of supply and control phases (Figs. 2, 4, 6) have the advantage of a balanced multi-phase load voltage, while in single-phase bus systems (Fig. 7) the phase distribution of the load voltage is greatly unbalanced, the corresponding phase distribution in a two-phase bus system being intermediate those of a single-phase bus system (Fig. 7) and a fully balanced multi-phase system (Figs. 2, 4, 6). Consequently, the choice of the preferred circuit design is somewhat governed by the requirements of each particular application, a three-phase system of a balanced design throughout (Figs. 2, 4, 6) being generally preferable, especially for multi-unit printing press drives, from the view point of most favorable load conditions to be imposed on the energizing power supply line.

While in the foregoing particular reference is made to printing press drives, it will be obvious that the invention is also applicable to multi-motor control systems for other fabricating or processing plants in which a number of coacting machinery units are operated at correlated or equal drive speeds such as in box making and packaging plants, or wherever a web or strand material passes through aligned working units to be successively processed or acted upon as is the case, for instance, in the paper making industry, textile industry, steel or metal rolling mills, chemical or thermal processing plants, or multiple conveyor systems.

Furthermore, while I have shown system embodiments with two groups of motors capable of mutually independent operation, it need hardly be explained that various features of my invention are applicable with only a single group of a selectively variable number of motors and that the invention can equally well be applied to systems for three or more groups of motors having a corresponding number of mutually insulated single-phase or multi-phase buses.

It will also be obvious to those skilled in the art, upon a study of this disclosure, that systems according to my invention can readily be modified as regards their components, individual elements or circuit connections and hence may be embodied in designs other than those specifically shown and described, without departing from the objects and essential features of my invention and within the scope of the claims annexed hereto.

I claim:

1. A multi-motor speed control system, comprising a group of parallel connected induction motors, alternating-current supply means, condition-responsive voltage control means for controlling the speed of said motors having a group of selectively operable control sections interposed between said supply means and said motors, selector switch means connected between said respective motors and said control means for selecting a desired number of said motors for simultaneous operation, and selector switch means connected with said control sections between said supply means and said motors for adapting the number of operative control sections and thereby the current capacity of said control means to said number of motors.

2. A multi-motor speed control system, comprising a group of parallel connected induction motors, alternating-current supply means, controllable impedance means interposed between said supply means and said motors for controlling the speed of said motors and having a group of selectively operable impedance sections, first selector switch means connected between said respective motors and said impedance means for selecting a desired number of said motors for simultaneous operation, and second selector switch means connected with said impedance sections between said supply means and said first selector switch means for correlating the number of operative impedance sections and thereby the current capacity of said control means to said number of motors.

3. A multi-motor speed control system, comprising a group of parallel connected induction motors, alternating-current supply means, saturable reactor means interposed between said supply means and said motors for controlling the speed of said motors and having a group of selectively operable reactor sections, first selector switch means connected between said respective motors and said reactor means for selecting a desired number of said motors for simultaneous operation, and second selector switch means connected with said reactor sections between said supply means and said first selector switch means for adapting the number of operative sections and thereby the current capacity of said reactor means to said number of motors.

4. A multi-motor speed control system for a multi-unit printing press drive or the like, comprising a group of induction motors mechanically interconnectable for operation at a common speed, alternating-current supply means, a controllable impedance device interposed between said supply means and said group of motors for controlling the motor speed and having a group of selectively operable impedance sections, first selector switch means connected between said motors and said impedance device for selecting a desired number of said motors for simultaneous operation, second selector switch means connected with said impedance sections between said supply means and said first selector switch means for adapting the number of operating impedance sections to said number of motors, said impedance device having impedance control means, and a control circuit connected with said control means and having voltage source means responsive to a speed-dependent operating condition of said motors to counteract departures of said speed from a desired value.

5. A multi-motor speed control system for a multi-unit printing press drive or the like, comprising a group of induction motors mechanically interconnectable for operation at a common speed, alternating-current supply means, saturable reactor means interposed between said supply means and said group of motors and having a group of selectively operable reactor sections, said reactor means having saturation control means for varying the reactance of said reactor means to thereby control said speed, first selector switch means connected between said motors and said reactor means for selecting a desired number of said motors for simultaneous operation, second selector switch means connected with said reactor sections between said supply means and said first selector switch means for adapting the number of operating reactor sections to said number of motors, and a control circuit connected with said saturation control means and having voltage supply means responsive to a load-dependent motor operating condition for regulating said speed.

6. A multi-motor speed control system for a multi-unit printing press drive or the like, comprising a group of induction motors mechanically interconnectable for operation at a common speed, alternating-current supply means, voltage control means interposed between said supply means and said group of motors and having a group of selectively operable control sections, said control means having a control circuit responsive to a motor operating condition for regulating said speed, first selector switch means connected between said respective motors and said control means for selecting a desired number of said motors for simultaneous operation, and second selector switch means connected with said control sections between said supply means and said first switch means and joined with said first switch means for setting the number of operative control sections in a fixed relation to said selected number of motors, whereby the current capacity of said control means is automatically adapted to said number of motors.

7. A multi-motor speed control system for a multi-unit printing press drive or the like, comprising a group of parallel arranged multi-phase induction motors, variable-voltage bus means, selective switch means connecting said respective motors with said bus means for selecting a desired number of said motors to be simultaneously energized through said bus means, multi-phase alternating-current supply mains, condition-responsive voltage control means disposed between said supply mains and said bus means for impressing controllable motor terminal voltage on said bus means to control the speed of said motors, said voltage control means having a group of selective sections, and selector switch means connected with said respective sections between said supply mains and said bus means for adapting the number of operative sections to said number of simultaneously energized motors.

8. A multi-motor speed control system for a multi-unit printing press drive or the like, comprising a group of parallel arranged multi-phase induction motors mechanically interconnectable for operation at a common speed, variable-voltage bus means, selector switch means connecting said respective motors with said bus means for selecting a desired number of said motors to be simultaneously energized through said bus means, alternating-current supply means, controllable impedance means having a group of impedance sections disposed between said supply means and said bus means for impressing controllable motor terminal voltage on said bus means to control the speed of said motors, said impedance sections having a common control circuit responsive to a motor operating condition for controlling said voltage and selector switch means connected with said respective sections between said supply means and said bus means for adapting the number of operative sections and thereby the current capacity of said impedance means to said number of simultaneously energized motors.

9. A multi-motor speed control system, comprising bus means, a group of induction motors parallel connected to said bus means, selector switch means series-connected with said respective motors for simultaneously energizing a selected number of said motors through said bus means, alternating-current supply means, condition-responsive impedance means having a group of impedance sections connected parallel to one another between said supply means and said bus means for controlling the speed of said motors, and selector switch means series connected with said respective impedance sections for adapting the number of operative sections to said number of motors.

10. A multi-motor control system, comprising bus means, a group of induction motors parallel connected to said bus means, selector switch means interposed between said respective motors and said bus means for operating a selected number of said motors, alternating-current supply means, a bank of saturable reactors having respective main windings connected parallel to one another between said supply means and said bus means and having respective saturation control windings for varying the impedance of said respective reactors, a control circuit connected with said control windings and having variable-voltage supply means responsive to a motor operating condition, and selector switch means connected with said respective main windings between said supply means and said bus means for adapting the number of operative reactors to said number of motors.

11. In a system according to claim 8, said impedance means comprising a saturable reactor having a main winding serially subdivided into said sections, and having a saturation control winding forming part of said control circuit.

12. A multi-motor speed control system for multi-unit printing press drives or the like, comprising first controllable alternating-current variable-voltage, constant frequency supply means and second controllable alternating-current variable-voltage, constant frequency supply means of individually controllable respective voltages, a first plurality of electric motors and appertaining respective switch means selectively parallel connecting said motors to said first supply means, a second plurality of electric motors and appertaining respective switch means selectively parallel connecting said latter motors to said second supply means, a third plurality of electric motors and appertaining respective selector switch means selectively parallel connecting said respective last-mentioned motors to a selected one of said two supply means, whereby a selected number of said third plurality of motors can operate together and at the same controlled voltage with a selected number of motors of either one of said first and second motor pluralities, said respective variable voltage supply means being controlled to maintain the speed of the motors connected to them, respectively, at predetermined values.

13. A multi-motor speed control system for multi-unit printing press drives or the like, comprising first bus means and second bus means insulated from each other, a first plurality of electric motors and appertaining selector switch means parallel connecting said respective motors to said first bus means, a second plurality of electric motors and appertaining selector switch means parallel connecting said respective latter motors to said second bus means, a third plurality of electric motors and appertaining selector switch means adapted for selectively parallel connecting said respective last-mentioned motors to a selected one of said two bus means, constant frequency, alternating-current supply means for energizing said motors, first controllable impedance means of adjustable current capacity connecting said supply means with said first bus means for impressing controlled voltage on the group of selected motors connected to said first bus means to control the speed of said motors, second controllable impedance means of adjustable current capacity connecting said supply means with said second bus means for impressing controllable voltage on the selected group of motors connected to said second bus means to control the speed of said motors, each of said impedance means having selective switch means for adapting the current capacity of said impedance means to the number of the appertaining group of selected motors.

14. A multi-motor speed control system for multi-unit printing press drives or the like, comprising first bus means and second bus means insulated from each other, a first plurality of induction motors and appertaining selector switch means parallel connecting a desired number of said motors to said first bus means, a second plurality of induction motors and appertaining selector switch means parallel connecting a desired number of said latter motors to said second bus means, a third plurality of electric motors and appertaining selector switch means parallel connecting a desired number of said last-mentioned motors to a selected one of said two bus means, constant frequency, multi-phase alternating-current supply means for energizing said motors, first saturable reactor means of adjustable current capacity connecting said supply means with said first bus means for impressing controlled voltage on said first bus means to control the speed of the selected motors, second saturable reactor means of adjustable current capacity connecting said supply means with said second bus means for impressing controllable voltage on the selected group of motors connected to said second bus means to control the speed of the motors of said group, selective switch means connected with each of said reactor means between the appertaining bus means and said supply means for adapting said current capacity to said appertaining group of selected motors, each of said reactor means having saturation controlling circuit means provided with voltage supply means responsive to an operating condition of the appertaining motor group for controlling the reactance to counteract unwanted speed variations of said group.

15. In a multi-motor control system according to claim 14, said switch means of each of said motors being connected with one of said switch means of said respective reactor means so that any selection of the number of parallel operating motors is accompanied by a corresponding capacity adjustment of said reactor means.

16. In a multi-motor control system according to claim 14, each of said saturable reactor means comprising a number of individual reactors having respective main windings disposed in parallel relation to one another, and said selective switch means appertaining to said reactor means having respective switch units series connected with a plurality of said reactor main windings for selecting a number of parallel connected reactors in accordance with the desired current capacity.

17. In a multi-motor control system according to claim 14, each of said saturable reactor means comprising a number of winding sections series connected with one another between the appertaining bus means and said current supply means, and said selective switch means appertaining to said reactor means having contacts connected to respective reactor points between said sections.

18. A multi-motor speed control system for multi-unit printing press drives or the like, comprising first bus means and second bus means insulated from each other, a first plurality of induction motors and appertaining respective switch means selectively parallel connecting a desired number of said motors to said first bus means, a second plurality of induction motors and appertaining respective switch means selectively parallel connecting a desired number of said latter motors to said second bus means, a third plurality of electric motors and appertaining respective selector switch means parallel connecting a desired number of said last-mentioned motors to a selected one of said two bus means, multi-phase, constant frequency, alternating-current supply means for energizing said motors, a first plurality of saturable reactors disposed in parallel between said supply means and said first bus means, a second plurality of saturable reactors disposed in parallel between said supply means and said second bus means, selectively actuable switches each being series-connected with one of said respective reactors of said first and second reactor pluralities, a third plurality of saturable reactors connected in parallel to said supply means and having respective selector switches attached to said first and second bus means for connecting a selected number of said latter reactors with a selected one of said two bus means, all of said reactors having respective saturation control winding means, two control circuits each being responsive to an operating condition of the group of selected motors connected to one of said respective bus means and being attached to said control winding means of the group of selected reactors connected to said one bus means for counteracting unwanted speed variations of said group of motors.

19. In a multi-motor control system according to claim 18, the total number of said reactors in each of said reactor pluralities being equal to the total number of said motors in each of said respective motor pluralities.

20. In a multi-motor control system according to claim 18, said switch means of each of said motors being connected with one of said switches of said respective reactors so that any selection of the number of parallel operating motors is accompanied by the selection of an equal number of appertaining parallel operating reactors.

21. In a multi-motor control system according to claim 18, said control winding means of said first and second pluralities of reactors being connected with one and the other respectively of said two control circuits, and said control winding means of said third plurality of reactors having respective selector switches attached to both of said control circuits for connecting each of said latter control winding means with a selected one of said two circuits.

22. A multi-motor speed control system for a printing press drive, comprising a folder motor and a plurality of press motors mechanically interconnectable for operating a selected number of said press motors together with said folder motor, bus means, said motors being connected to said bus means in parallel relation to one another, switch means series-connected with said respective press motors for selectively energizing said selected number of press motors together with said folder motor, constant frequency, alternating current supply means, voltage control means connecting said supply means with said bus means for varying the bus potential to control the speed of said energized motors, speed responsive voltage supply means connected with said folder motor to provide a variable signal voltage, said control means having a control circuit connected with said voltage supply means to be impressed by said signal voltage for causing said control means to counteract unwanted speed variations of said energized motors.

23. A multi-motor speed control system for a printing press drive, comprising a folder motor and a plurality of press motors mechanically interconnectable for operating a selected number of said press motors together with said folder motor, all of said motors being multi-phase induction motors, bus means, said motors being connected to said bus means in parallel relation to one another, switch means series-connected with said respective press motors for energizing said selected number of press motors together with said folder motor, multi-phase current supply means for energizing said motors, controllable impedance means having a plurality of impedance sections connected between said supply means and said bus means and having selector switch means for adapting the number of said sections to said selected number of press motors to correspondingly adjust the current capacity of said impedance means, speed responsive voltage supply means connected with said folder motor to provide a variable signal voltage, said impedance means having control circuit means connected with said voltage supply means to be subject to said signal voltage for counteracting unwanted speed variations of said energized motors.

24. A multi-motor speed control system for a printing press drive, comprising a folder motor and a plurality of press motors mechanically interconnectable for operating a selected number of said press motors together with said folder motor, all of said motors being multi-phase induction motors, speed responsive voltage supply means connected with said folder motor to provide a variable signal voltage, bus means, said motors being connected to said bus means in parallel relation to one another, switch means series-connected with said respective press motors for selectively energizing said selected number of press motors together with said folder motor, multi-phase current supply means for energizing said motors, saturable reactor means of adjustable current capacity connecting said current supply means with said bus means for controlling the potential of said bus means and having a saturation control circuit connected with said voltage supply means to be impressed by said signal voltage for counteracting unwanted speed variations of said energized motors.

25. In a multi-motor control system according to claim 12 for a multi-unit printing press drive, each of said first and second pluralities of motors comprising a folder motor and press motors, said folder motors being connected with said respective first and second variable-voltage supply means, two circuit means of speed-responsive voltage connected with said respective folder motors to provide signal voltages indicative of the respective speeds of said folder motors, said two variable-voltage supply means having respective control circuits connected with said respective circuit means to be controlled in dependence upon said respective signal voltages for maintaining the speed of each group of interconnected folder and press motors at a desired value.

26. In a multi-motor speed control system according to claim 14 for a multi-unit printing press drive, each of said first and second pluralities of motors comprising a folder motor and press motors, said folder motors being connected with said respective first and second variable-voltage supply means, and said two condition-responsive voltage supply means comprising respective speed-responsive devices connected with said respective folder motors to impress said saturation controlling circuit means with respective signal voltages indicative of the speeds of said respective folder motors.

27. In a multi-motor speed control system according to claim 7, said bus means having fewer phase conductors than the number of phases of said supply mains, each of said motors having a number of terminal means equal to said number of phases of said supply mains, each phase conductor of said bus means being connected with one terminal means of each of said respective motors, said remaining terminal means of each motor being directly connected with respective ones of said phases of said mains, and said voltage control means being connected between said bus means and a remaining phase of said supply mains.

28. A multi-motor control system, comprising a group of parallel connected induction motors, variable-voltage bus means, selector switch means connecting said respective motors with said bus means for selecting a desired number of said motors to be simultaneously energized through said bus means, alternating-current supply means, saturable reactor means having a group of reactor sections connected between said supply means and said bus means for impressing controlled voltage on said bus means, each of said reactor sections having a saturation control coil, a control circuit connected to all saturation control coils of said group of reactor sections, a saturable transfer reactor and a rectifier connected in series with each other to said supply means, said rectifier being outputwise connected with said control circuit to provide excitation for said control coils, said transfer reactor having saturation control means comprising a saturation control coil connected to said bus means for controlling said excitation in dependence upon said controlled voltage of said bus means.

29. In a system according to claim 10, said condition-responsive variable-voltage supply means comprising an amplifying mixer outputwise connected with said control circuit to impress amplified voltage thereupon and having a plurality of input circuits for jointly controlling said amplified voltage, voltage supply means of normally constant voltage connected with one of said input circuits, another one of said input circuits being connected with said bus means to be impressed by voltage dependent upon that of said bus means, and one of said input circuits having potentiometric resistance means for adjusting the excitation of said latter input circuit in accordance with a desired motor operating condition.

30. A multi-motor control system for multi-unit printing press drives or the like, comprising first bus means and second bus means insulated from each other, a first plurality of induction motors and appertaining respective switch means selectively parallel connecting a desired number of said motors to said first bus means, a second plurality of induction motors and appertaining respective switch means selectively parallel connecting a desired number of said latter motors to said second bus means, a third plurality of electric motors and appertaining respective selector switch means parallel connecting a desired number of said last-mentioned motors to a selected one of said two bus means, multi-phase alternating-current supply means for energizing said motors, a first group of voltage control devices disposed in parallel between said supply means and said first bus means, a second group of voltage control devices disposed in parallel between said supply means and said second bus means, selectively actuable switches each being series-connected with one of said respective devices of said first and second groups, a third group of voltage control devices connected in parallel to said supply means and having respective selector switches attached to said first and second bus means for connecting a selected number of said latter devices with a selected one of said two bus means, all of said devices having respective control means, two control circuits each being responsive to an operating condition of the selected motors connected to one of said respective bus means and being attached to said control means of the selected devices connected to said one bus means.

31. A control system according to claim 30, comprising a group of two-way selector contact means attached on the one hand to said respective voltage control devices of said third group and on the other hand to said two control circuits for selectively connecting each of said latter devices with a selected one of said control circuits, and a group of substitute resistors connected through said respective contact means with the nonselected one of said two control circuits, said resistors having load characteristics substantially similar to those of said respective control means so that the load conditions of said two control circuits are substantially independent of the voltage control devices selected from said third group.

32. In a control system according to claim 31, said contact means being mechanically joined with said respective selector switches to operate together therewith.

33. A multi-motor speed control system, comprising a group of parallel connected induction motors, multi-phase alternating-current supply means, condition-responsive voltage control means for controlling the speed of said motors having a group of selectively operable control sections interposed equally in series in all of the phases of said alternating-current supply means between said supply means and said motors, selector switch means connected between said respective motors and said control means for selecting a desired number of said motors for simultaneous operation, and selector switch means connected with said control sections between said supply means and said motors for adapting the number of operative control sections and thereby the current capacity of said control means to said number of motors.

34. A multi-motor speed control system, comprising a group of parallel connected induction motors, multi-phase alternating-current supply means, controllable impedance means interposed equally in series in all of the phases of said alternating-current supply means between said supply means and said motors for controlling the speed of said motors and having a group of selectively operable impedance sections, first selector switch means connected between said respective motors and said impedance means for selecting a desired number of said motors for simultaneous operation, and second selector switch means connected with said impedance sections between said supply means and said first selector switch means for correlating the number of operative impedance sections and thereby the current capacity of said control means to said number of motors.

35. A mutli-motor speed control system, comprising a group of parallel connected induction motors, multi-phase alternating-current supply means, saturable reactor means interposed equally in series in all of the phases of said alternating-current supply means between said supply means and said motors for controlling the speed of said motors and having a group of selectively operable reactor sections, first selector switch means connected between said respective motors and said reactor means for selecting a desired number of said motors for simultaneous operation, and second selector switch means connected with said reactor sections between said supply means and said first selector switch means for adapting the number of operative sections and thereby the current capacity of said reactor means to said number of motors.

References Cited in the file of this patent

UNITED STATES PATENTS

| Number | Name | Date |
|---|---|---|
| 830,947 | Whitehurst | Sept. 11, 1906 |
| 1,304,288 | Emmet | May 20, 1919 |
| 1,390,624 | Lamme | Sept. 13, 1921 |
| 2,565,157 | Wickerham | Aug. 21, 1951 |